(12) United States Patent (10) Patent No.: US 8,726,050 B2
Lin et al. (45) Date of Patent: *May 13, 2014

(54) COMPUTER POWER SUPPLY WITH LOW STANDBY POWER

(75) Inventors: Wen-Tsung Lin, Taipei (TW); Yu-Hsun Lin, Taipei (TW)

(73) Assignee: J.R.J. Electronic Co., Ltd., Taipei (TW)

( * ) Notice: Subject to any disclaimer, the term of this patent is extended or adjusted under 35 U.S.C. 154(b) by 241 days.

This patent is subject to a terminal disclaimer.

(21) Appl. No.: 13/323,028

(22) Filed: Dec. 12, 2011

(65) Prior Publication Data

US 2013/0151868 A1 Jun. 13, 2013

(51) Int. Cl.
*G06F 1/26* (2006.01)
(52) U.S. Cl.
CPC ..................................... *G06F 1/263* (2013.01)
USPC .......................................... 713/300; 323/355

(58) Field of Classification Search
USPC ......... 713/1, 2, 100, 300, 310, 320, 321, 322, 713/323, 324, 330, 340, 375
See application file for complete search history.

(56) References Cited

U.S. PATENT DOCUMENTS

2006/0224801 A1* 10/2006 Chiu et al. ...................... 710/70

* cited by examiner

*Primary Examiner* — Paul Yanchus, III
*Assistant Examiner* — Paul J Yen
(74) *Attorney, Agent, or Firm* — Egbert Law Offices, PLLC

(57) ABSTRACT

A computer power supply with low standby power has a power inlet wired to an external AC power supply, a DC conversion circuit wired to convert AC into DC, a power control switch operating an AC switch, a power supply circuit connected to the power control switch, a power outlet connected to the power control switch, a starting circuit, a power bus connected to the power supply circuit to transfer DC to the host computer, and a start button connected to a starting circuit. The start button starts the power supply circuit, supplies power to the hose computer, and transmits switching signals of the computer.

3 Claims, 5 Drawing Sheets

COMPUTER POWER SUPPLY WITH LOW STANDBY POWER

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a computer power supply that is equipped with a switching device to turn off the power on the mainboard and cut off the standby power of the peripherals when the host computer is in a standby state. More particularly, the present invention relates to an innovative one which permits activation of the power supply by the start button of the host computer, and supply power to the mainboard and the connected peripherals simultaneously. When the computer is turned off, the standby power consumption of the power supply is only about 0.002 watt for better energy conservation.

2. Description of Related Art Including Information Disclosed Under 37 CFR 1.97 and 37 CFR 1.98

A common power supply (A) (shown in FIG. 1) for a computer unit is equipped with an AC outlet (B) connected with external AC, which is converted into stable DC via various electronic parts (C), and then linked to the host computer by bus (D). When the host computer and peripherals are in standby state, the power supply (A) is still connected with external AC power supply.

When the host computer and peripherals are in standby state, the power supply (A) is connected with external AC power supply, so the live electronic parts (C) will still consume power. A power switch (E) is set on the back of the casing of the host computer (A), requiring you to manually operate it with some trouble. Moreover, the computer peripherals (e.g.: screen and multi-media parts) can be wired with the host computer or connected with AC via other power sockets. When the host computer is turned off but the power supply isn't switched off, it is required to cut off the switch of the peripherals, leading to possible power waste if you forget or neglect to turn off the peripherals.

Thus, to overcome the aforementioned problems of the prior art, it would be an advancement if the art to provide an improved structure that can significantly improve the efficacy.

Therefore, the inventor has provided the present invention of practicability after deliberate design and evaluation based on years of experience in the production, development and design of related products.

BRIEF SUMMARY OF THE INVENTION

The primary objective of the present invention is to provide a computer power supply with lower standby power, which only requires to turn on AC and start up the host computer by the start button, enabling the host computer's power supply to automatically control input/output of AC in tune with voltage change.

Another objective of the present invention is to provide a computer power supply with lower standby power, which permits to cut off AC input to electronic parts for energy conservation when the host computer and peripherals are in standby state.

The other purpose of the present invention is to provide a computer power supply with lower standby power, which permits multiple electronic parts in the power supply to cut off AC for longer service life when the host computer and peripherals are in standby state.

The technical scheme of the present invention is as follows. A computer power supply with low standby power has a power inlet, wired to external AC. A DC conversion circuit is wired to AC of the power inlet to convert into DC of predefined voltage. A power control switch is wired to AC of the power inlet to operate AC switch. A computer power supply circuit is connected with the power control switch and converts AC into multiple DCs for the host computer, and is wired to an electrical transmission line. A power outlet is connected with the power control switch and supply AC of the power inlet to the peripherals. A starting circuit is connected with the DC conversion circuit and the power control switch as well as the electrical transmission line of the computer power supply circuit, maintaining AC input of the power control switch to the computer power supply circuit. A switching circuit is wired to the starting transmission line of the start button, from which a switching signal transmission line is extended to connect with the node on the mainboard. A power bus is connected with the computer power supply circuit to transfer DC to the host computer. A start button, with its starting point connected to the starting circuit, is used to convert AC to DC and input to the host computer and the starting circuit, and also connected to the switching circuit to transmit switching signals of the computer.

The features of the present invention will be more readily understood upon a thoughtful deliberation of the following detailed description of a preferred embodiment of the present invention with reference to the accompanying drawings.

Although the invention has been explained in relation to its preferred embodiment. It is to be understood that many other possible modifications and variations can be made without departing from the spirit and scope of the invention as hereinafter claimed.

DETAILED DESCRIPTION OF THE INVENTION

Figure 1:
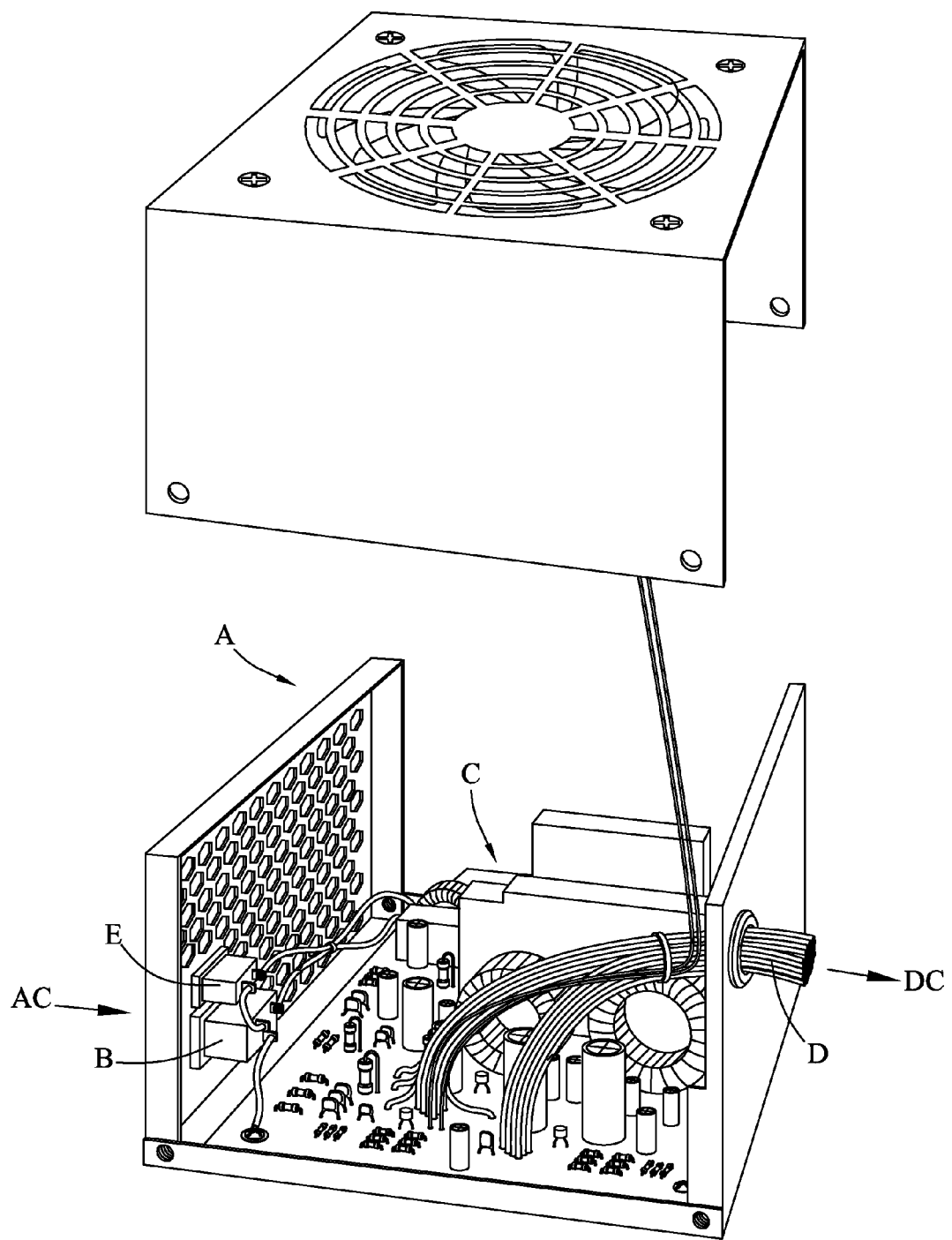
FIG. 1 is an exploded view of a common power supply.
Figure 2:
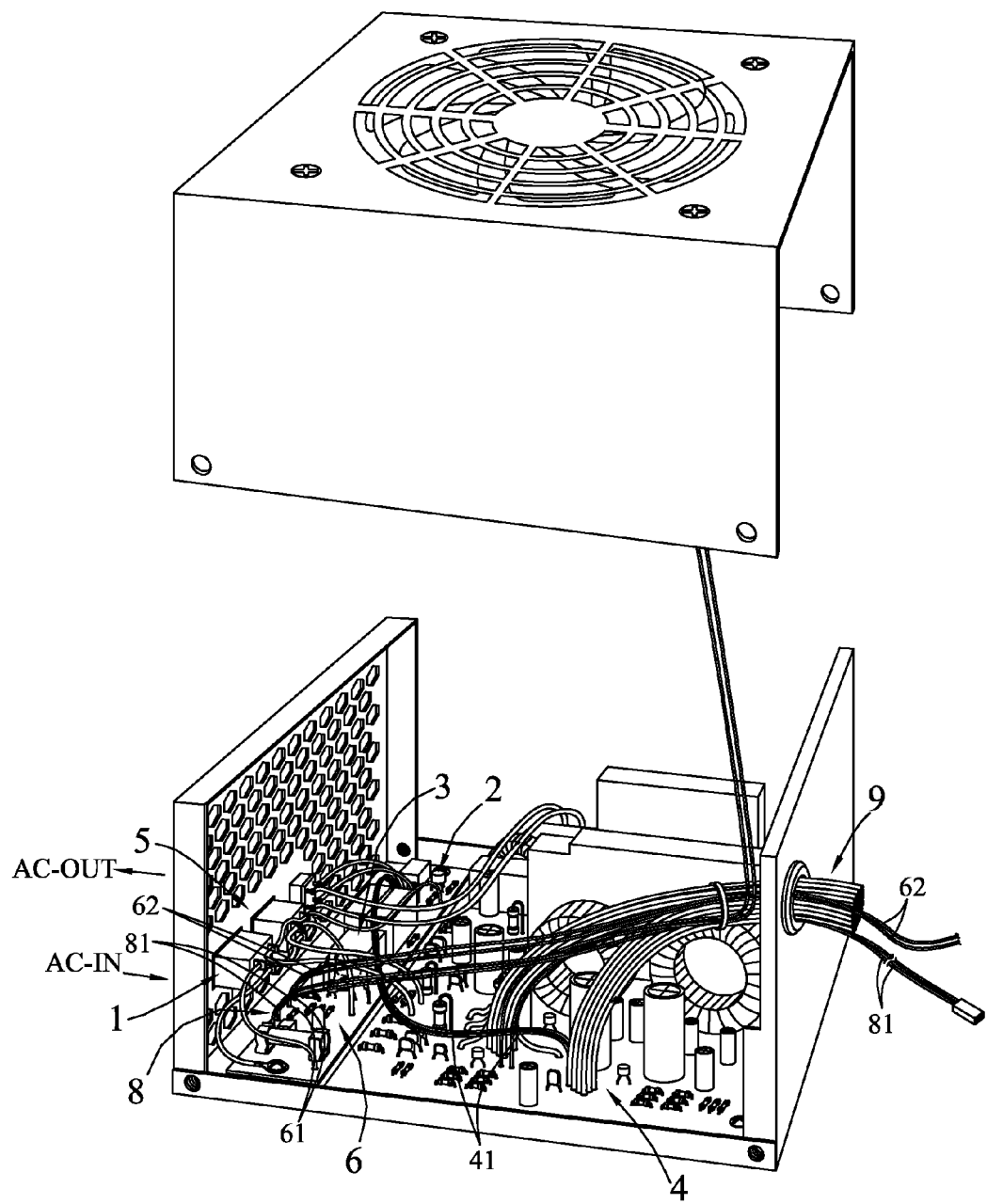
FIG. 2 is an exploded view of the computer power supply of the present invention.

Referring to FIGS. 2-5, the computer power supply of the present invention mainly comprises a power inlet 1, a DC conversion circuit 2, a power control switch 3, a computer power supply circuit 4, a power outlet 5, a starting circuit 6, a start button 7, a switching circuit 8, a power bus 9 and a mainboard 10.

Figure 3:
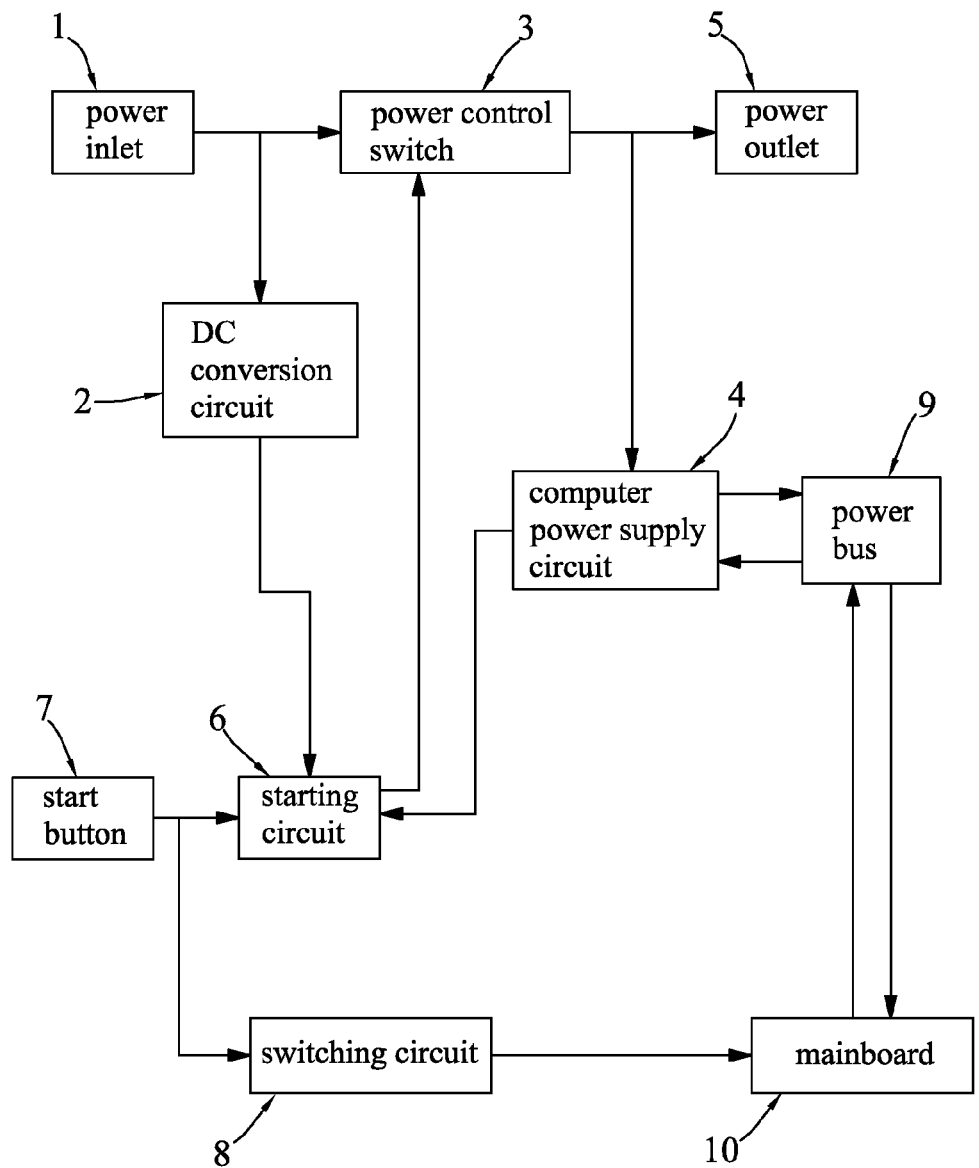
FIG. 3 is a block chart of the present invention.

FIG. 3 depicts a block chart of the present invention, wherein the power inlet 1 is wired with external AC that is connected separately with DC conversion circuit 2 and power control switch 3. The power control switch 3 is then connected with the computer power supply circuit 4 and the power outlet 5, such that the computer power supply circuit 4 allows to convert external AC wired with the power inlet 1 and output multiple DC voltages to the mainboard 10 via the power bus 9, and also supply AC to the computer peripherals via the power outlet 5.

The DC conversion circuit 2 is connected with the starting circuit 6, which is equipped with a starting terminal 61 wired to a starting transmission line 62 and connected with the start button 7. An electrical transmission line 41 on the computer power supply circuit 4 supplies AC to the power control switch 3 after turning on, while the switching circuit 8 is wired to the starting transmission line 62, from which a switching signal transmission line 81 is extended to connect with the node 101 on the mainboard 10.

When the computer of the present invention is turned on, you may press the start button 7, and transfer starting signal simultaneously through the starting transmission line 62 of the starting circuit 6 and the switching circuit 8 (shown in FIGS. 2, 5), and operate the power control switch 3 to input AC to the computer power supply circuit 4, then convert multiple DC voltages to the mainboard 10 via the power bus 9 (e.g.: SAT DC, 20Pin 5V, 12V DC), also supply AC to the computer peripherals via the power outlet 5. That means the computer power supply circuit 4 permits the electrical transmission line 41 to transfer power to the starting circuit 6 and maintain the channel of the power control switch 3, such that AC is continuously supplied to the computer power supply circuit 4 and the power outlet 5, while the switching signal transmission line 81 of the switching circuit 8 transfers starting signal to the mainboard 10, enabling to receive the power from the computer power supply circuit 4.

When the computer is turned off, the mainboard 10 transfers signal via the power bus 9 to the computer power supply circuit 4, stops power supply of the electrical transmission line 41 and turns off the starting circuit 6, thus cutting off AC of the power control switch 3 and the power outlet 5. In such a case, AC is only connected to the DC conversion circuit 2 as a lower standby power (approx. 0.002 watt).

Figure 4:
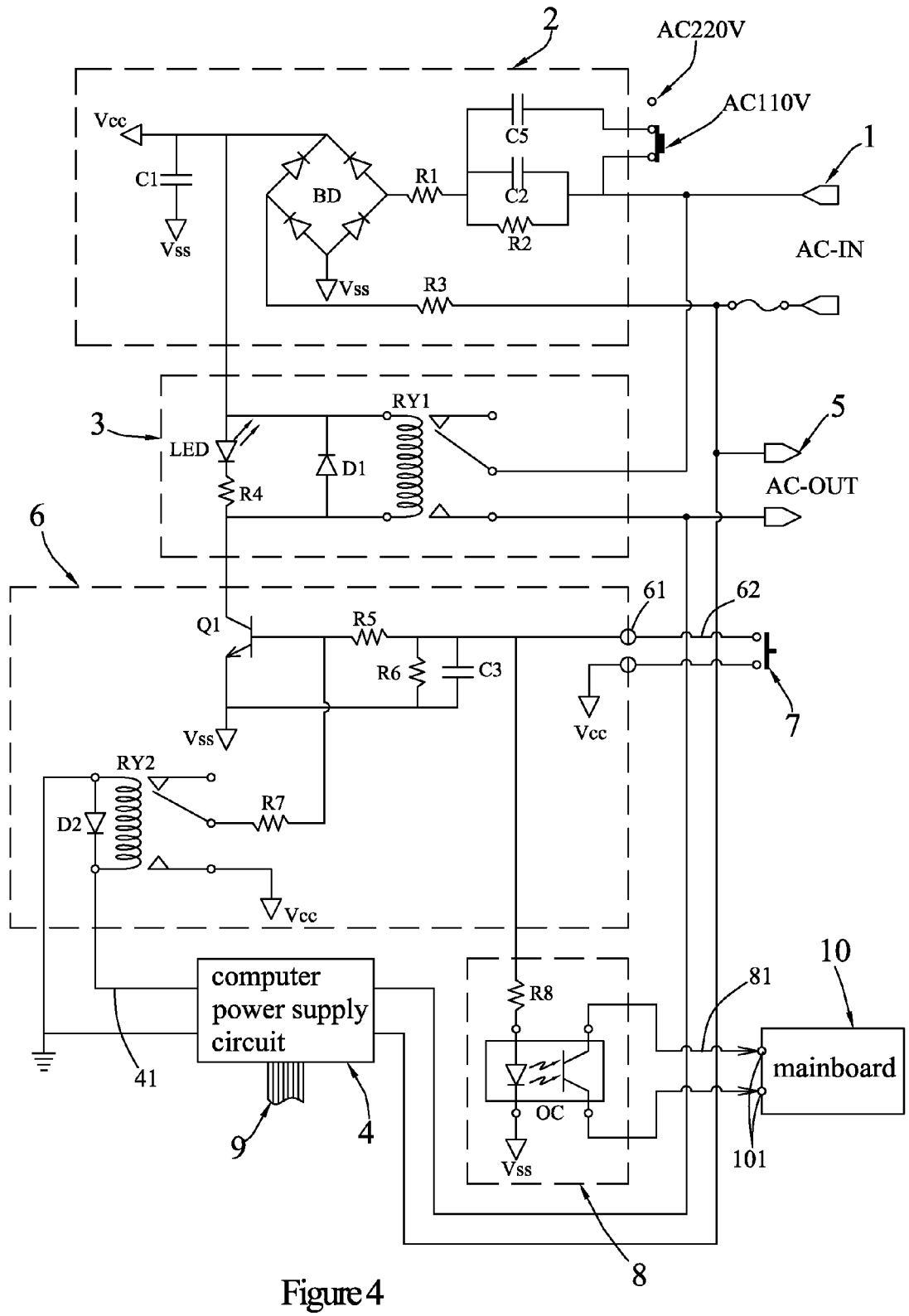
FIG. 4 shows a preferred embodiment of the circuit of the present invention.
Figure 5:
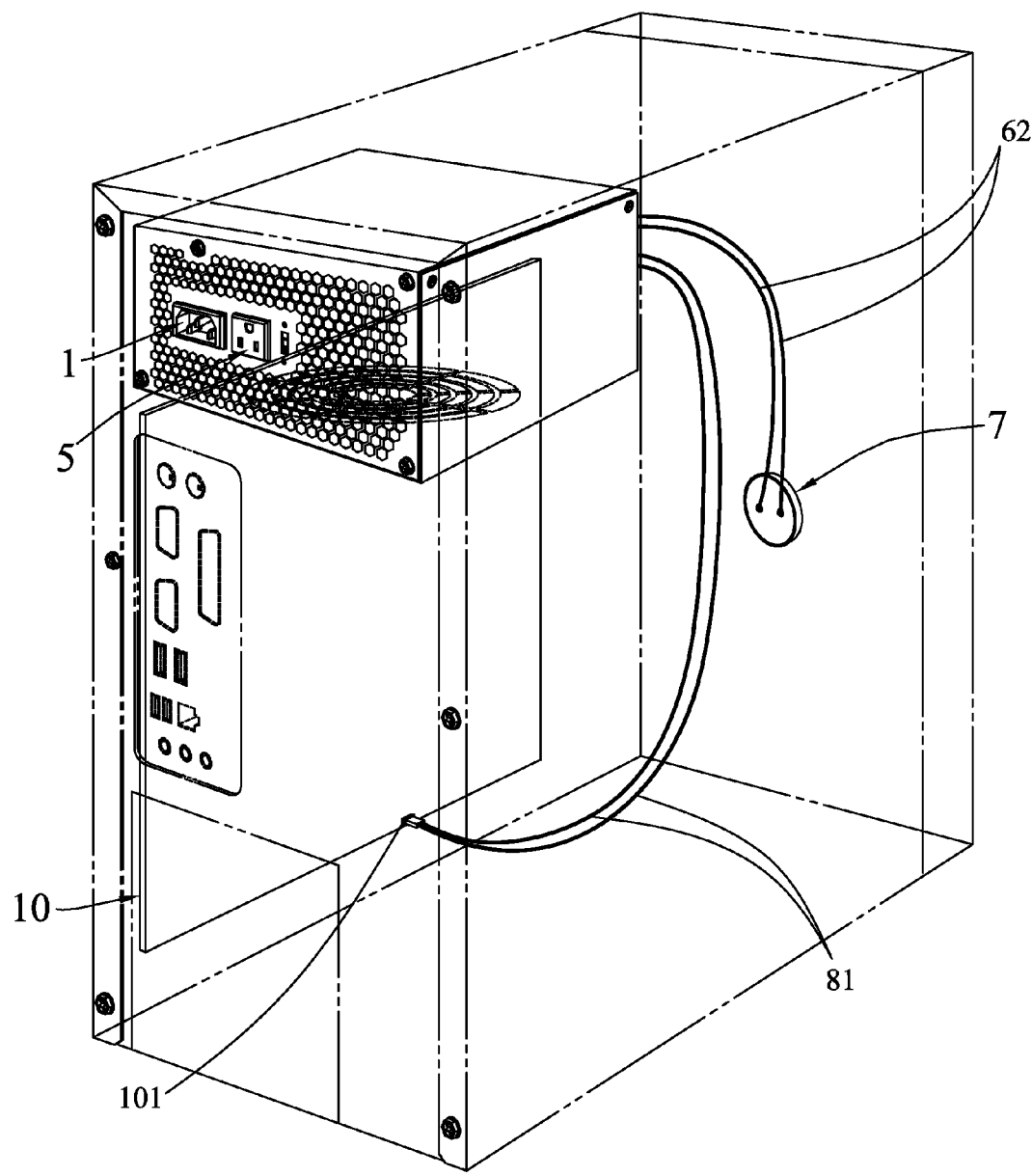
FIG. 5 is a schematic view of the preferred embodiment of the present invention.

FIG. 4 depicts another preferred embodiment of the present invention, wherein the DC conversion circuit 2 comprises AC input (AC-IN), bridge rectifier (BD), resistors (R1, R2, R3), capacitors (C1, C2, C5), DC positive voltage (Vcc) and DC negative voltage (Vss). AC voltage switched by AC input (AC-IN) will match properly the power ratings of the capacitors (C2, C5) and resistors (R1, R2, R3), such that AC is converted to DC positive voltage (Vcc) for the power control switch 3 and starting circuit 6.

The power control switch 3 comprises LED indicator (LED), resistor (R4), diode (D1), relay (RY1) and AC output (AC-OUT). A starting signal is fed from the starting circuit 6, so the relay (RY1) is activated to turn on AC output (AC-OUT) and output AC to the peripherals. Meanwhile power is supplied to the computer power supply circuit 4, and multiple DCs are converted for the mainboard 10 wired to an electrical transmission line 41, and the LED indicator (LED) shows the operating conditions of power supply.

The starting circuit 6 comprises switch (Q1), resistors (R5, R6, R7), capacitor (C3), diode (D2), relay (RY2), DC positive voltage (Vcc), DC negative voltage (Vss), starting terminal 61 and starting transmission line 62. The starting transmission line 62 wired to the starting terminal 61 is connected with the start button 7 and the electrical transmission line 41 of the computer power supply circuit 4.

When the computer is turned on, you may press the start button 7 to input DC positive voltage (Vcc) to the capacitor (C3). The resistor (R5, R6) could extend the predefined release time of the capacitor (C3). Turning on the switch (Q1) could activate the power control switch 3, such that AC is supplied to the computer power supply circuit 4, namely, DC V supplied to the starting circuit 6 from the electrical transmission line 41 could activate the relay (RY2), then DC positive voltage (Vcc) is used to turn on the switch (Q1) via a resistor (R7) and supplied to the relay (RY1) of the power control switch 3, such that AC input (AC-IN) could maintain power supply to the computer power supply circuit 4 and AC output (AC-OUT). While pressing the start button 7, DC positive voltage (Vcc) from the switching circuit 8 is supplied to an optical coupler (OC) via resistor (R8), then a starting signal is transmitted to the mainboard 10 via the switching signal transmission line 81, thus triggering the mainboard 10 when the relevant components receive the power from the computer power supply circuit 4.

When the computer is turned off, the computer power supply circuit 4 stops power supply to the starting circuit 6 by tripping of the relay (RY2). The switch (Q1) turns off automatically the power of relay (RY1) of the power control switch 3, and stops AC to the AC output (AC-OUT), such that the computer power supply circuit 4 and the peripherals are switched off simultaneously. In such a case, AC is only connected to the DC conversion circuit 2 as a lower standby power (approx. 0.002 watt). The present invention can also be applied to other electronic devices for the purpose of saving energy.

To sum up, the structure and functions of present invention along with the detailed descriptions have been improved practically, showing that the novel model of the present invention could further increase the efficiency of power supply, simplify the electronic device and enhance its energy-saving efficacy. Also, this an innovative product not yet publicly available complying with the spirit of new patents, so the patent claims are made hereto.

The appearance, configuration and overall performance of the present invention are illustrated without departing from the spirit and scope of the present invention, and also subject to equivalent change and modification or revision as a part of the present invention.

We claim:

1. A computer power supply with low standby power, the computer power supply comprising:
    a power inlet wired to an external AC;
    a DC conversion circuit wired to the external AC of the power inlet to convert into DC;
    a power control switch wired to the external AC of the power inlet to operate an AC switch;
    a computer power supply circuit connected with the power control switch and converting AC into multiple DCs for a host computer, the computer power supply circuit wired to an electrical transmission line;
    a power outlet connected with the power control switch so as to supply the external AC of the power inlet to peripherals;
    a starting circuit connected with the DC conversion circuit and the power control switch as well as the electrical transmission line of the computer power supply circuit, the starting circuit maintaining AC input of the power control switch;
a start button having a starting point connected to the starting circuit, the start button for starting the starting transmission line of a switching circuit;
a switching circuit wired to the starting transmission line of the start button said switching circuit having a switching signal transmission line extended to connect with a node on a mainboard; and
a power bus connected with the computer power supply circuit to transfer DC of predefined voltage to the host computer.

2. The computer supply of claim 1, wherein the electrical transmission line of the computer power supply circuit supplies power only after the mainboard is turned on.

3. The computer supply of claim 1, wherein the power outlet is connected with two or more parallel receptacles.

\* \* \* \* \*